(12) United States Patent  
Case

(10) Patent No.: US 7,312,407 B2
(45) Date of Patent: Dec. 25, 2007

(54) NON-METALLIC ELBOW CONDUIT TRANSITION FITTING

(76) Inventor: Gerald Case, Case Electrical Enterprises 24812 Hon Ave., Laguna Hills, CA (US) 92653

( * ) Notice: Subject to any disclaimer, the term of this patent is extended or adjusted under 35 U.S.C. 154(b) by 0 days.

(21) Appl. No.: 11/341,185

(22) Filed: Jan. 28, 2006

(65) Prior Publication Data

US 2007/0175661 A1 Aug. 2, 2007

(51) Int. Cl.
*H02G 3/18* (2006.01)
(52) U.S. Cl. .................. 174/650; 174/68.1; 174/71 R; 174/135; 285/179; 285/149.1
(58) Field of Classification Search ............. 174/65 R, 174/68.1, 68.3, 72 A, 71 R, 95, 96, 135; 285/179, 184, 183, 119, 61, 149.1; 248/49, 248/62; 138/172, 177, 178, 111; 403/169, 403/403, 205, 170, 171, 180, 382; 52/656.9, 52/655.1
See application file for complete search history.

(56) References Cited

U.S. PATENT DOCUMENTS

| 3,729,217 | A | * | 4/1973 | Metcalf ..................... 285/183 |
| 4,103,101 | A | * | 7/1978 | Maier ....................... 174/65 R |
| 4,387,914 | A | * | 6/1983 | Paulson et al. ............. 285/119 |
| 4,461,498 | A | * | 7/1984 | Kunsman .................... 285/179 |
| 4,730,855 | A | * | 3/1988 | Pelletier ................... 174/71 R |
| 4,927,103 | A | * | 5/1990 | Nicholson ................... 248/62 |
| 5,016,924 | A | * | 5/1991 | Lin ............................. 285/179 |
| 5,779,280 | A | * | 7/1998 | Hedman ....................... 285/184 |
| 6,123,366 | A | * | 9/2000 | Kiriakopolos et al. ........ 285/61 |
| 6,155,609 | A | * | 12/2000 | Kirma ........................ 174/65 R |
| 6,247,869 | B1 | * | 6/2001 | Lichvar ....................... 403/205 |
| 2005/0206160 | A1 | * | 9/2005 | Ericksen et al. |
| 2006/0022456 | A1 | * | 2/2006 | Hull et al. |

* cited by examiner

*Primary Examiner*—Angel R. Estrada
(74) *Attorney, Agent, or Firm*—Steins & Associates, P.C.

(57) ABSTRACT

A Non-metallic Elbow Conduit Transition Fitting is disclosed. The fitting is specifically suited to interconnect vertical electrical conduit runs and horizontal electrical conduit runs in commercial construction environments. The fitting is suitable for immersion within poured concrete floors used in commercial building construction. The fitting is designed to threadedly engage a vertical run of EMT (metallic) conduit with a horizontal run of nonmetallic (e.g. PVC) conduit. A final aspect of the fitting is that it must have a short sweep angle bend so that it is adequately buried within a concrete floor made from 6 inches of concrete.

17 Claims, 6 Drawing Sheets

NON-METALLIC ELBOW CONDUIT TRANSITION FITTING

BACKGROUND OF THE INVENTION

1. Field of the Invention

This invention relates generally to electrical wiring and conduit and, more specifically, to a Non-metallic Elbow Conduit Transition Fitting.

2. Description of Related Art

Commercial building construction generally involves the use of metal framing and concrete flooring. This approach is used due to the superior long-term durability and fire safety that these types of structures provide. The construction of these buildings is essentially a process of erecting the building floor-by-floor using metal framing members and then pouring a concrete floor as each level is completed.

As a result of this specialized approach, there are many utilities installation approaches that are radically different in the commercial construction environment as compared to the residential construction environment. A particular distinction exists between residential electrical systems and commercial electrical systems. While in a residential system, electrical wiring passes from floor-to-floor many times through wall studs, floor joists and ceiling rafters, when in the commercial building the concrete flooring prevents this approach.

When electrical wiring passes from floor-to-floor in a commercial building, it generally rises vertically through a penetration into the concrete floor of the floor above. The wiring then is rerouted to the perimeter of the floor so that it might gain access to exterior walls and/or junction boxes located elsewhere in the building. This approach is used because typically electrical wiring comes from the outer walls towards the center rather than coming up through the floor for use in the center of the floor. This permits the greatest flexibility in moving nonstructural walls within the commercial space.

In the past when transitioning from a vertical conduit riser into a conduit lateral housed within a concrete floor, there has been no off-the-shelf product available. The problem is that the vertical conduit is typically snap-on or threaded metallic conduit in order to comply with typical electrical building codes, when the conduit passes through concrete it is generally of a non-metallic type.

In order to interconnect the non-metallic horizontal lateral and the metallic vertical riser, the electrician will typically be required to modify some existing metallic conduit connector because there previously has been none suited for this particular application. The typical off-the-shelf elbow does not provide the non-metallic solvent or slip-fitting at one end while providing the threaded connection for interfacing with metallic conduit at the other end. Furthermore, the bend radius of a typical conduit elbow tends to be greater than is acceptable for encasing in a thin concrete floor.

What is needed then is a non-metallic low-clearance elbow that provides a transition from metallic conduit to non-metallic conduit without need for further modification.

SUMMARY OF THE INVENTION

In light of the aforementioned problems associated with the prior devices, it is an object of the present invention to provide a Non-metallic Elbow Conduit Transition Fitting. The fitting should be specifically suited to interconnect vertical electrical conduit runs and horizontal electrical conduit runs in commercial construction environments. The fitting should be suitable for immersion within poured concrete floors used in commercial building construction. The fitting should be designed to threadedly engage a vertical run of EMT (metallic) conduit with a horizontal run of nonmetallic (e.g. PVC) conduit. Another important aspect of the fitting is that it must have a short sweep angle bend so that it is adequately buried within a concrete floor made from 6 inches of concrete.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Non-metallic Elbow Conduit Transition Fitting.

Figure 1:
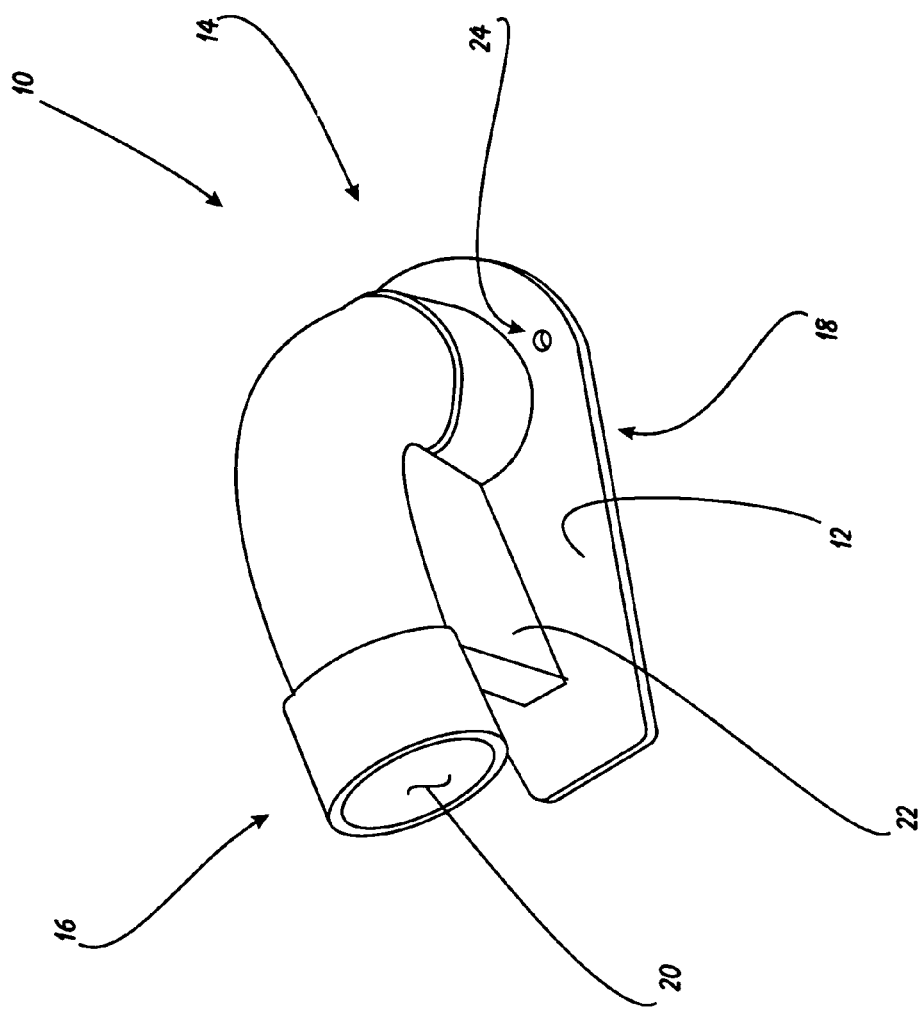
FIG. 1 is a perspective view of a preferred embodiment of the transition fitting of the present invention.

The present invention can best be understood by initial consideration of FIG. 1. FIG. 1 is a perspective view of the preferred embodiment of the non-metallic elbow conduit transition fitting 10 of the present invention. The fitting 10 is defined by a flat base 12 and an elbow extending upwardly there from. The elbow has a lower first end 14 and an upper second end 16 at a right angle to it. The first end 14 has a threaded socket which is suited for threaded engagement with conventional steel conduit such as EMT. The second end 16 is defined by a slip socket 20 which is designed to provide a convenient solvent conduit connection such as for ENT conduit. The upright portion of the elbow 10 is stabilized by a web 22 interconnecting the base 12 and the second end 16. The web 22 is essentially a strengthening fin to provide stiffness and stability from the non-metallic material from which the fitting 10 is made. The base 12 is further defined by a plurality of fastener apertures 24 formed in it. The faster apertures 24 are provided so that the fitting 10 can be attached to the metallic sub-floor in the desired locations. Once installed then the conduit can be connected to the fittings first and second ends, 14 and 16 respectively.

The portion of the fitting 10 comprising the first end 14 defines a first central axis 19 that is at the center of the first end 14 and is oriented longitudinally thereto. The portion of the fitting 10 comprising the second end 16 defines a second central axis 21 that is at the center of the second end 16 and is oriented longitudinally thereto. As depicted, the first axis 19 is perpendicular relative to the second axis 21. If we now turn to FIG. 2, we can further examine the fitting 10 of the present invention.

Figure 2:
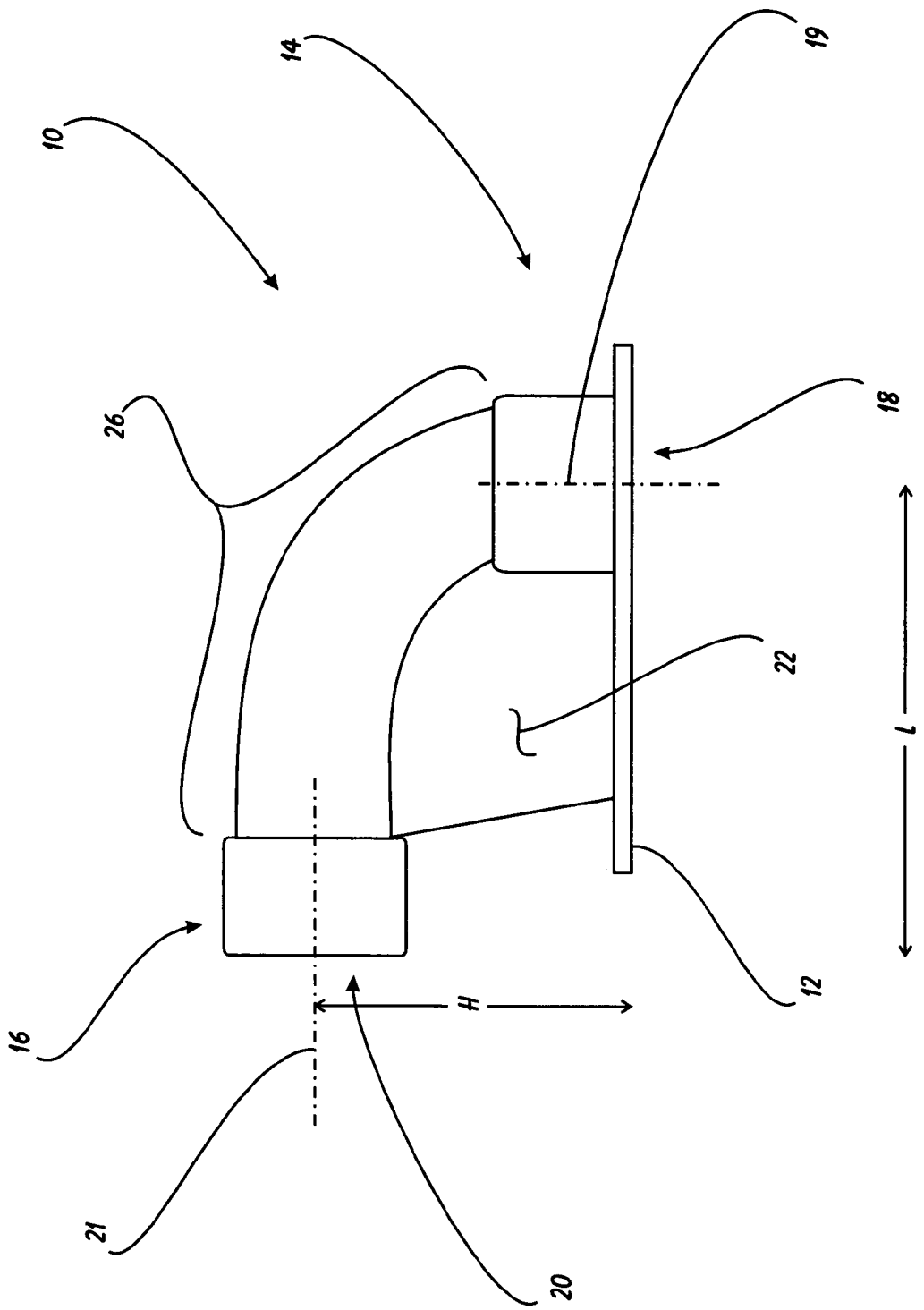
FIG. 2 is a side view of the fitting of FIG. 1.

"FIG. 2 is a side view of the fitting of FIG. 1. As shown here, the threaded socket 18 of the first end 14 is accessed through a hole formed in the bottom of the base 12. The first end 14 arid second end 16 are interconnected by a tubular center section 26. As should be apparent from the drawing, the height H which is the distance between the bottom face of the base and the center of the slip socket 20 is less than the length L which is the distance from the face of the second end 16 to the center of the first end 14. What this means is that the fitting 10 has a low profile. This low profile is specifically designed into the fitting 10 so that it will be well below the top surface of the typical poured concrete floor used in commercial high rise buildings. One should also note that the web 22 extends upwardly from the base 12 to the tubular center section 26 adjacent to the second end 16. If we now turn to FIGS. 3A and 3B we can further examine this unique device."

FIGS. 3A and 3B are bottom and top views, respectively, of the fitting of FIGS. 1 and 2. FIG. 3A depicts the bottom view of the fitting 10 of the present invention. The upper end of the fitting is defined by a collar 30B which is enlarged as compared to the tubular center section. An internal bore 28 is formed in between the first end and the second end. Also shown here are the three fastening apertures 24 that are available for the installation electrician to attach the fitting 10 to the concrete sub-floor prior to running wiring and interconnecting conduit. The base 12 as shown here has a flanged portion surrounding the outer side of the first end. It further has an elongated tapered portion extending towards the second end from the first end. This enlarged flat shape provides supreme stability for the fitting during the installation process. FIG. 3B depicts the tubular center section 26 as it interconnects the first end 14 and the second end 16. If we now turn to FIG. 4, we can continue to examine this device.

Figure 3:
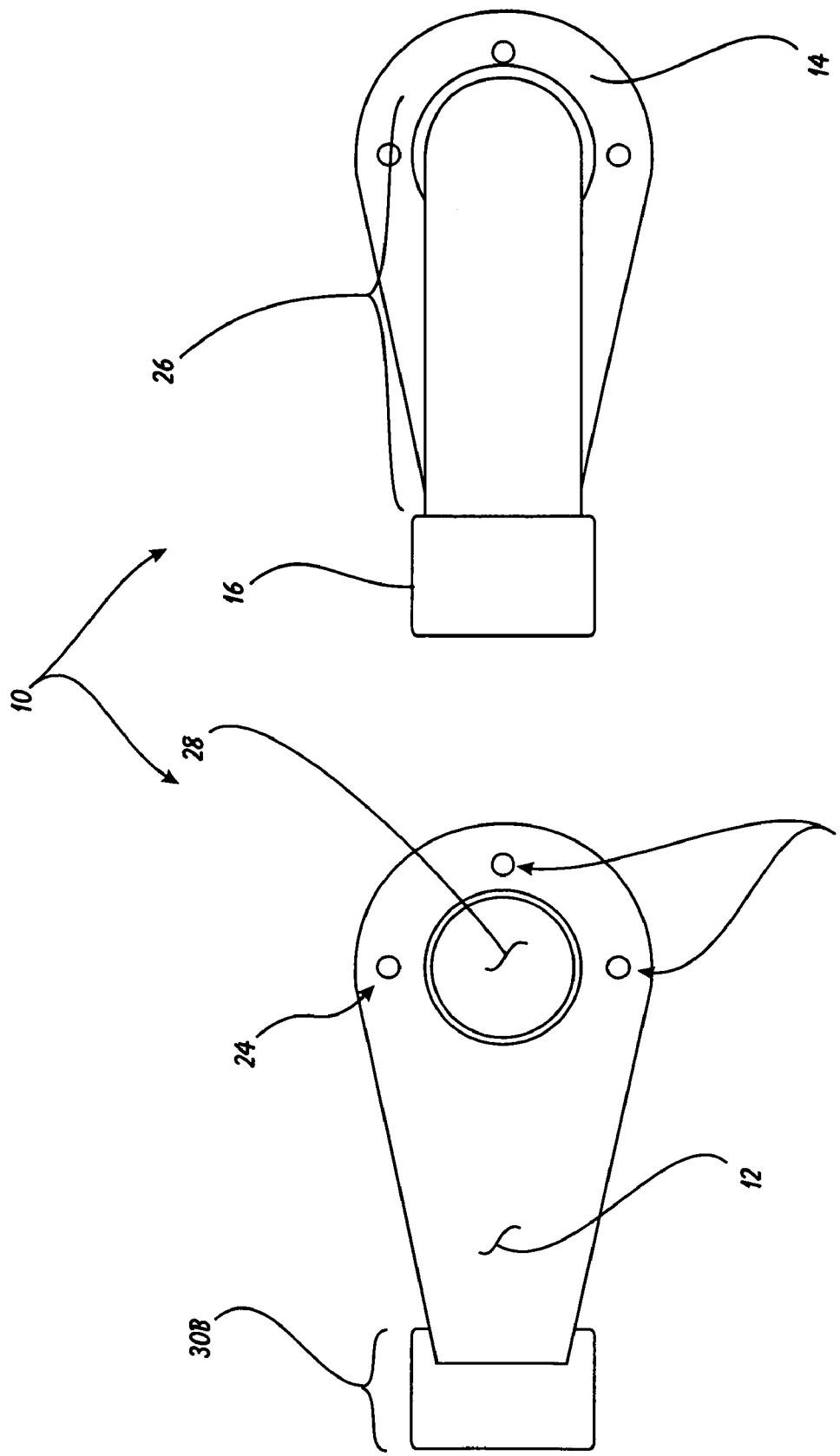
FIGS. 3A and 3B are bottom and top views, respectively, of the fitting of FIGS. 1 and 2.
Figure 4:
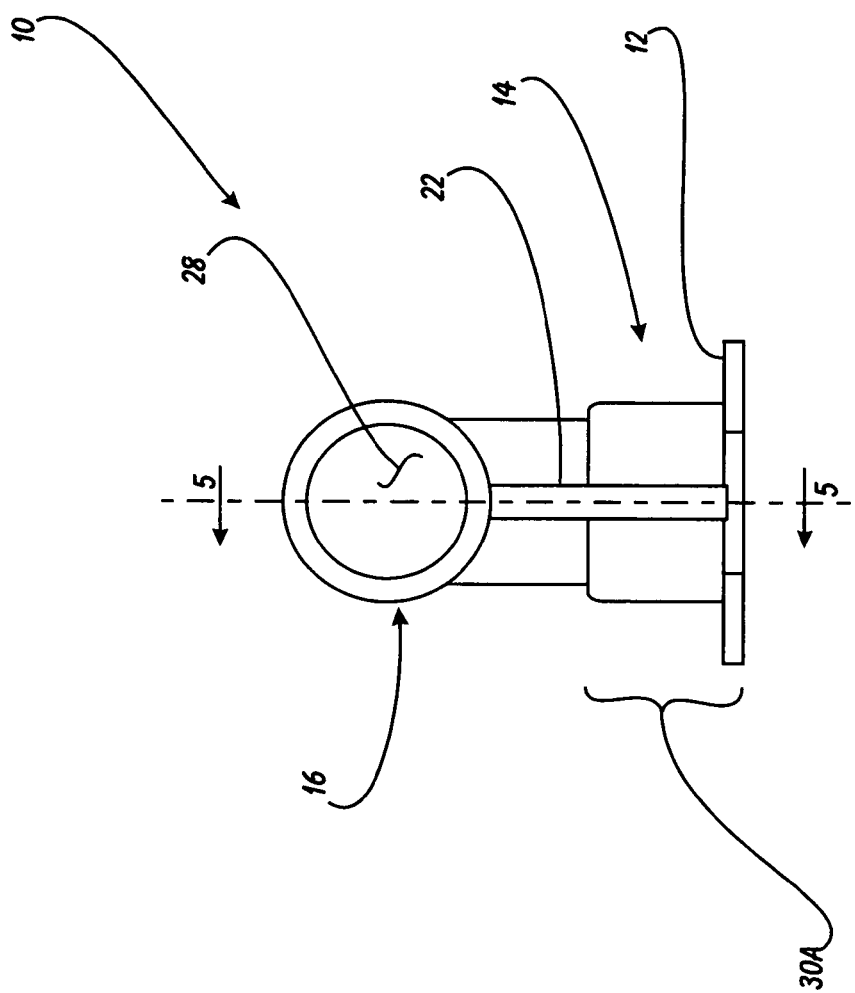
FIG. 4 is an end view of the fitting of FIGS. 1-3.

FIG. 4 is an end view of the fitting of FIGS. 1-3. As shown here, the internal bore 28 executes a right-angle turn within the fitting from the bottom to where it exits at the second end 16. The first end 14 is defined by an enlarged collar 30A. The collars 30A and 30B have an outer profile that is wider than the tubular center section. This is for two reasons: first is because the internal bore 28 is enlarged in these portions to accept the conduit either threadedly engaged or glued in place inside of the collars 30A and 30B; second, the wall thickness at the collars 30A and 30B is thicker than at the tubular center section in order to provide additional structural strength and prevent breakage by inadvertently jostling the conduit connected to the fitting at these points. If we now turn to FIG. 5, we can see the internal profile of the fitting of the present invention.

Figure 5:
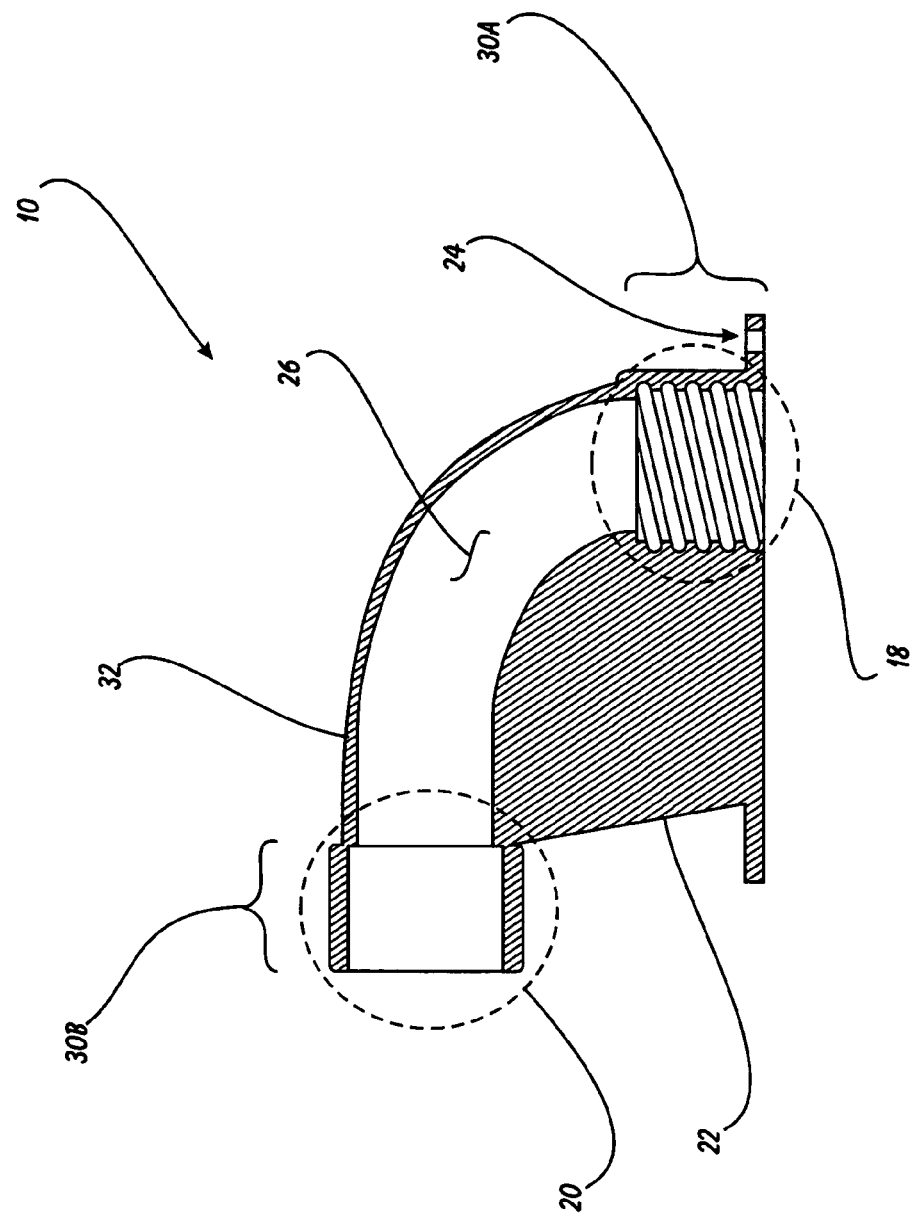
FIG. 5 is a cutaway side view of the fitting of FIGS. 1-4.

FIG. 5 is a cutaway side view of the fitting of FIGS. 1-4. As shown here the tubular center section 23 has a gentle curve to it that is shorter than it is long. Again, this is provided to leave ample space above the fitting for concrete to prevent the concrete floor from being too thin in spots over the conduit fitting 10. The threaded socket 18 is defined by a plurality of threads formed within it. These threads are configured to accept the standard EMT conduit fitting threaded therein. The slip socket 20 is sized to allow non-metallic, such as PVC, piping to be glued into it. The web 22 is a solid piece of material that again provides a fairly rigid structural brace for the upper portion of the fitting 10. If we finally turn to FIGS. 6A and 6B, we can examine how this fitting is used.

Figure 6A:
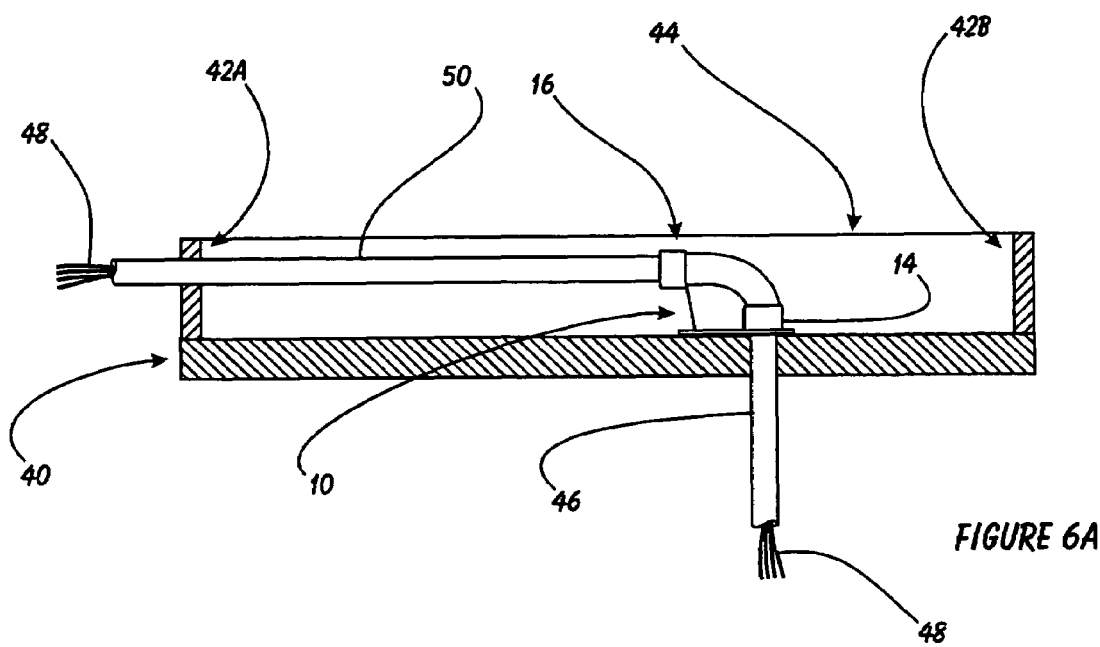
FIGS. 6A and 6B are cutaway side views depicting the usage pattern for the fitting of FIGS. 1-5.
Figure 6B:
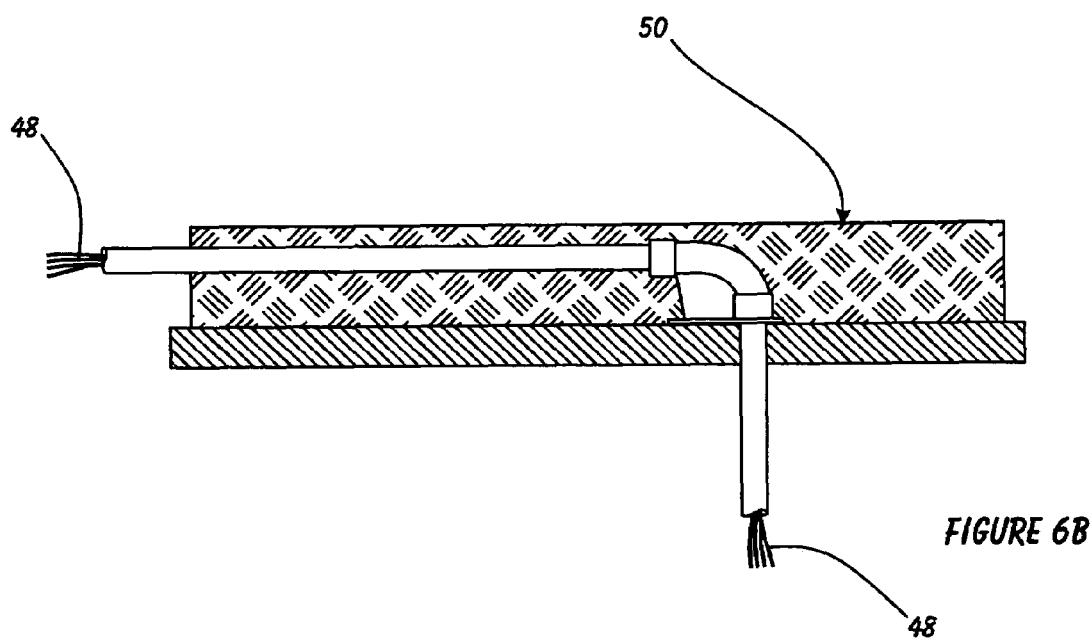

FIGS. 6A and 6B are cutaway side views depicting the usage pattern for the fitting of FIGS. 1-5. In FIG. 6A, we can see the typical commercial high rise floor section prior to the concrete floor being poured. Here the floor substrate plating 40, which is generally steel plate, is in place and attached to the structural steel framing of the building (not shown). A hole has been cut through the plating where a metallic conduit riser 46 will be penetrating from the bottom floor to the top floor. The fitting 10 is simply attached to the plating 40 such that the first end 14 is centered on the hole formed in the plating 40. The metallic conduit riser 46 is threaded into the first end 14 and the fitting 10 is attached using screws or bolts inserted through the attachment apertures formed in the base of the fitting. The non-metallic conduit lateral 50 is glued into the second end 16 and extended until it passes through the concrete form 42A which in this depiction forms the left side of the concrete floor. The forms 42A and 42B have a height that will ultimately define the finished floor line 44. The wiring 48 is typically threaded through the metallic riser 46 and the non-metallic lateral 50 while the conduit is being attached to the fitting 10. This is typically the easiest way to thread the wiring through the conduit.

As can be imagined, this situation will be repeated several times throughout a particular floor of a commercial high rise building until all of the wiring that needs to pass from one floor to the next is complete. Once all of the wiring and other utilities are installed, then concrete is poured into the forms 42. Once the concrete is cured, the forms 42 are removed and the solid concrete floor of FIG. 6B is the result. As can be seen, the wiring 48 now passes upwardly from the bottom floor into the particular concrete floor shown here and then out the side where it can transition to a junction box or more conduit.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A fitting for interconnecting electrical conduit sections, comprising:
   a base defining a substantially flat bottom face;
   a first end extending upwardly from said base, said first end being generally circular in cross-section and defining a first central spacial axis perpendicular to said bottom face;
   a curved tubular center section having a bottom portion extending from said first end and terminating in an upper portion;
   a second end extending from said upper portion, said second end being generally circular in cross-section and defining a second central spacial axis, said second central spacial axis being at a right angle to said first central spacial axis;
   said second spacial axis being separated by a dimension H from said bottom face;
   said base bottom face further defining a width that is greater than said first end and a dimension L that is greater than said dimension H; and
   a web interconnecting said base and said curved tubular center section.

2. The fitting of claim 1, wherein said base, said first end, said curved tubular center section, said second end and said web are constructed from a single homogeneous piece of non-metallic material.

3. The fitting of claim 2, wherein said dimension L is greater than 1.2 times said dimension H.

4. The fitting of claim 3, further defined by a plurality of fastener apertures formed through a flanged portion of said base.

5. The fitting of claim 4, wherein said first end is defined by said first collar having an internally threaded bore and said second end is defined by a second collar defined by a bore devoid of threads therein.

6. A conduit fitting, comprising:
a one-piece, non-metallic body defining a tubular elbow having a first end defining a base having a substantially flat bottom face defining a length 1 and a width w, and a first cylindrical collar formed therein, and a second end defining a second cylindrical collar, said first cylindrical collar having a threaded bore formed therein, said second cylindrical collar having a smooth-walled bore formed therein, said collars each defining a central axis, said axes at relative right angles with said flat bottom face in spaced relation to said second cylindrical collar central axis by a dimension that is less than said length 1.

7. The fitting of claim 6, further comprising:
a base, said base having a generally flat bottom surface perpendicular to said first collar axis, said threaded bore accessed through an aperture formed in said base;
a curved tubular center section interconnecting said first and second collars; and
a web interconnecting said base and said tubular center section.

8. The fitting of claim 7, further comprising:
a dimension H is defined by a distance between said bottom face of said base and a second collar central axis;
a dimension L is defined by a distance between an end face of said second collar and a first collar central axis; and
whereby said dimension H is less than said dimension L.

9. The fitting of claim 8, wherein said dimension L is greater than 1.2 times said dimension H.

10. The fitting of claim 9, wherein said base is defined by a first side and a a second side, said first side being adjacent to said first collar and transitioning into said second side adjacent to said web, said first side defining a semicircular outer periphery, said second side having a non-semicircular outer periphery.

11. The fitting of claim 10, wherein said second side of said base terminates in a substantially flat end, said second side further defined by a pair of non-parallel side edges emanating at said semicircular outer periphery of said first end and terminating at said substantially flat end.

12. A conduit elbow, comprising:
a first elbow end defined by a base having a substantially flat bottom face, said base further having a first cylindrical collar formed therein and at least one fastener aperture formed through said base adjacent to said first cylindrical collar, said first cylindrical collar further having an outer surface and defining a threaded inner bore penetrating said bottom face;
a non-threaded curved tubular center section defining a generally smooth-walled curved inner bore in fluid communication with said threaded inner bore; and
a second elbow end at a ninety degree angle to said first elbow end, said second elbow end defined by a second cylindrical collar having an outer surface and defining a generally smooth-walled inner bore in fluid communication with said curved inner bore and said threaded inner bore.

13. The elbow of claim 12, wherein said base further defines a flat base in a spacial plane defined by a lower face of said first cylindrical collar, said flat base having a flanged portion encircling a portion of said first cylindrical collar and a tapered elongate portion in spaced relation with said second elbow end.

14. The elbow of claim 13, farther comprising a stiffening web interconnecting said tapered elongate portion of said base and said curved tubular center section adjacent to said second elbow end.

15. The elbow of claim 14, further comprising:
a dimension H defined by a distance between a bottom surface of said base and said a central axis defined by said second collar;
a dimension L is defined by a distance between an end face of said second collar and a first collar central axis; and
whereby said dimension H is less than said dimension L.

16. The elbow of claim 15, wherein said dimension L is greater than 1.2 times said dimension H.

17. The elbow of claim 16, further defined by a plurality of fastener apertures formed through said flanged portion of said base.

* * * * *